Aug. 28, 1956   SHELDON S. L. CHANG   2,761,082
SPLIT POLE MOTOR
Filed Nov. 12, 1952

ROTOR BARS
SKEWED
40 ELECTRICAL
DEGREES

INVENTOR.
SHELDON S. L. CHANG,
BY Allen & Allen
ATTORNEYS.

United States Patent Office 2,761,082
Patented Aug. 28, 1956

2,761,082

SPLIT POLE MOTOR

Sheldon S. L. Chang, Springfield, Ohio, assignor to Robbins & Myers, Inc., Springfield, Ohio, a corporation of Ohio Application November 12, 1952, Serial No. 319,935

6 Claims. (Cl. 310—187)

This invention relates to a single phase induction motor with concentrated primary windings.

There are four types of commonly used single phase induction motors, namely: the split phase motor, the capacitor start motor, the permanent-split capacitor motor, and the shaded pole motor. In the first three types of motors, distributed primary windings are used. In the shaded pole motor, concentrated windings are used. By "distributed winding" is meant a winding with two or more coils per pole per phase distributed in different slots. A "concentrated winding" is a winding with only one coil per pole per phase. There are two phases in a single phase induction motor; the main phase and the auxiliary phase. The shading coil constitutes a concentrated auxiliary phase winding in a shaded pole motor.

In induction motors of the fractional horsepower and sub-fractional horsepower sizes, the winding cost constitutes a major portion of the total cost. A concentrated winding is cheaper than a distributed winding as is very well verified by the comparatively low cost of the shaded pole motor. Because of its poor performance, however, the concentrated winding has not been widely used except in the shaded-pole motor. The efficiency of a shaded pole motor is usually 30% or less and its starting torque is very low, being about one-third of the full-load torque. The efficiency of a motor of the first three types with distributed windings is generally between 50% and 70% and its starting torque is one to four times the full-load torque. Numerous experimental motors of the first three types have been built with concentrated windings of conventional construction with unsatisfactory results.

It is an object of the present invention to provide a single phase induction motor of the split phase, or the capacitor start, or the permanent-split capacitor type with concentrated windings. By a novel construction which I shall describe, the disadvantages of using a concentrated winding are avoided. With this new construction, the motor is comparable in performance to, but much lower in cost than a motor of the same type with distributed windings.

Another object of the invention is to provide a construction wherein the main poles are reduced in circumference as the distance from the air gap increases so that the amount of copper required is reduced. In connection with this object a further object involves the provision of flats on the poles so as to further reduce the material costs.

These and other objects of the invention which will be pointed out in greater detail hereinafter, or which will be apparent to one skilled in the art upon reading these specifications, I accomplish by that certain construction and arrangement of parts, of which I shall now describe an exemplary embodiment.

Reference is made to the drawings forming a part hereof, and in which.

Briefly, in the practice of my invention, I provide a number of main poles and an equal number of auxiliary poles. Between the main poles and auxiliary poles I provide slots for the windings. The main poles have substantially centrally thereof winding slots which are considerably smaller in depth and width than the winding slots above referred to, and the relationship between the main and auxiliary poles is on the order of about two to one, so that the main poles occupy from 60% to about 75% of the pole pitch, and the auxiliary poles occupy the balance, i. e., from about 40% to about 25% of the pole pitch. On these poles I wind concentrated windings with the main windings being wound in the slots around the main poles, and with the auxiliary windings being wound over approximately one-half of the main poles and the entire auxiliary poles.

Referring now in more detail to the drawings, the main poles are indicated at 20, and the auxiliary poles are indicated at 30. It will be observed that the main poles occupy about two-thirds of the pole pitch.

Figure 1:
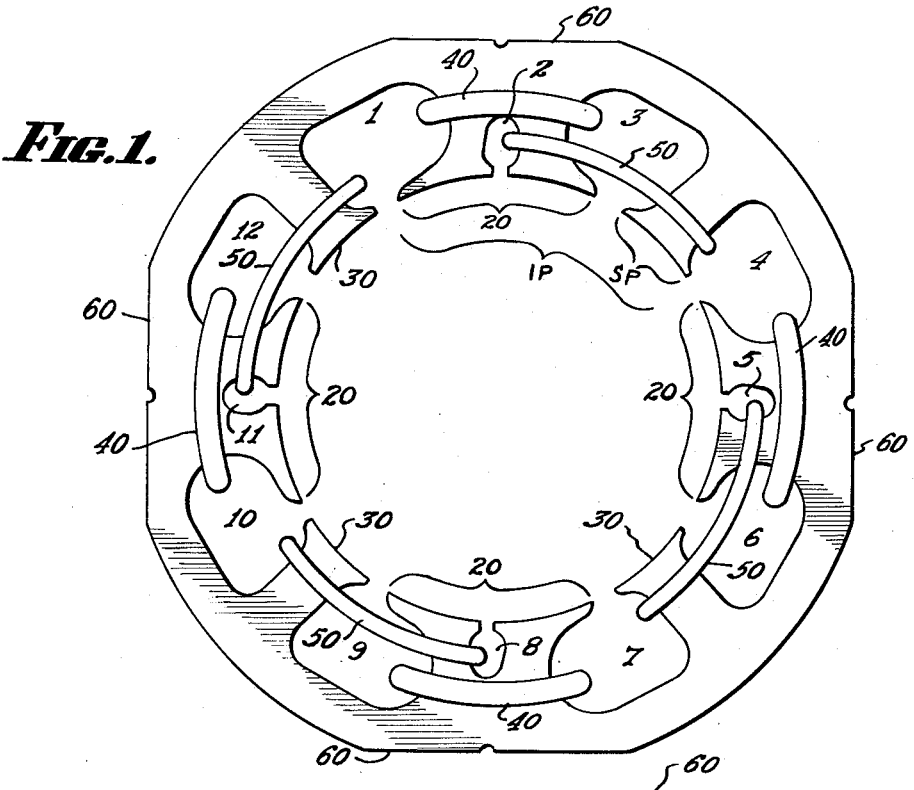
Figure 1 is a somewhat diagrammatical view of one of the stator laminations showing the pole arrangement and winding arrangement.

In Figure 1 the poles are separated by the slots 1, 4, 7 and 10. The main poles and auxiliary poles are separated respectively by the slots 3, 6, 9 and 12.

Substantially centrally of each of the main poles 20 there is provided a slot of considerably smaller dimensions than the slots heretofore mentioned, which slots are indicated at 2, 5, 8 and 11.

The main windings are wound around the main poles as indicated at 40, and the auxiliary windings are wound around the auxiliary poles 30 and one-half of the main poles 20, as indicated at 50. Thus, the main windings are wound between the slots 1 and 3, between the slots 4 and 6, between the slots 7 and 9, and between the slots 12 and 12; while the auxiliary windings respectively are wound between the slots 2 and 4, between the slots 5 and 7, between the slots 8 and 10, and between the slots 11 and 1.

Figure 2:
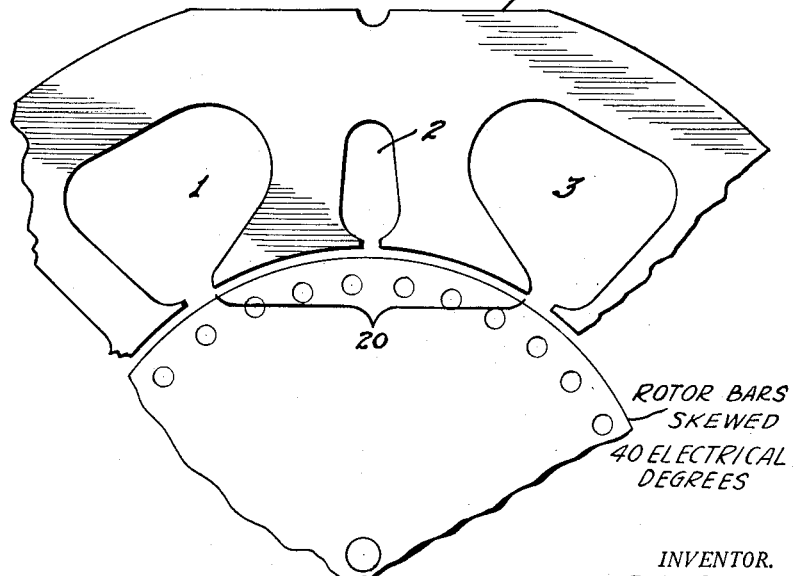
Figure 2 is a fragmentary view similar to Figure 1 showing one of the main poles in greater detail.

From a consideration of Figure 2, it will be observed that the pole waist is of substantially reduced extent so that in the completed stator the pole waist will have a substantially smaller circumference. The copper requirements are thereby materially reduced, since the main windings 40 extend around the waist of the main poles.

Furthermore, it will be observed that because concentrated windings are used the poles may be provided with the flats indicated at 60 whereby the cost of the stator is further reduced.

The effect of splitting each pole into a main pole and an auxiliary pole and then splitting the main pole approximately in the middle with a small slot can best be understood by studying the origin and ill effects of the harmonic currents in a motor. The harmonic currents are generated by the stator magnetomotive force. Since this magnetomotive force is not sinusoidally distributed along the air gap, it is equivalent to a fundamental sinusoidal magnetomotive force having by a number of harmonic magnetomotive forces superimposed thereon. Thus, in a motor of p poles, there is present only the sinusoidal flux of p holes. The fluxes of 3 p poles, 5 p poles etc. are also present due to the third, fifth, etc. harmonic magnetomotive forces. The harmonic fluxes induce harmonic rotor currents of corresponding order, and the harmonic currents interact in much the same way with the harmonic flux, as the fundamental currents with the fundamental flux.

Let us take as an example a motor of four poles with an appreciable amount of third harmonic in the stator magnetomotive force. This in turn induces third harmonic currents in the rotor. The system of third harmonic fluxes and currents has 3×4, or twelve poles, and behaves very much like a twelve pole motor compounded on the same shaft as the ideal four pole motor with sinusoidally distributed fluxes and currents. Energized by a 60 cycle current, the four pole motor has a synchronous speed of 1800 R. P. M., while the third harmonic system has a synchronous speed of 600 R. P. M. The third harmonic system again can be divided into a forward rotating component and a backward rotating component by the method of symmetrical components. The backward rotating component consumes energy from the electrical source besides acting as a brake on the shaft. The forward rotating component acts differently at speeds above and below 600 R. P. M. At speeds below 600 R. P. M., it acts as an induction motor and delivers mechanical power to the shaft. At speeds above 600 R. P. M., it acts as an induction generator by taking mechanical power from the shaft and converting it back to electrical power to return to the electrical source. This generator action is very inefficient, however, and the net effect is an appreciable reduction of the mechanical power output with a negligible decrease of the electrical input. For instance, suppose that the fundamental flux and current converts 100 watts of electrical energy into 50 watts of mechanical energy. The backward rotating component of the third harmonic might consume 4 watts of electrical energy and 2 watts of mechanical energy, and the forward rotating component of the third harmonic might consume 10 watts of mechanical energy and return 1 watt of electrical energy. Thus, the net effect of the third harmonic is to consume 3 watts of electrical energy and 12 watts of mechanical energy. The above example is given to illustrate the nature of the effects of a harmonic flux at speeds above its synchronous speed. The numerical values differ in each case, depending on the amount and phase of the harmonic content as well as the speed of operation.

The unfavorable generator effect of the harmonic flux reaches its maximum at a speed slightly above the synchronous speed (600 R. P. M. in the above example). At times, the mechanical power consumed by the harmonic at such speeds is so pronounced that sharp dips are introduced into the speed torque curve. These sharp dips are known technically as "cusps" in the speed torque curve.

Summarizing the above, the ill effects of the harmonics are:
1. Reduction in efficiency and output at running speeds.
2. Introduction of cusps in the speed torque curve.

The above discussion on the effect of harmonics is substantiated by a rigorous mathematical theory in a paper by the applicant, "Equivalent Circuits and Their Application in Designing Shaded Pole Motors," A. I. E. E. Transactions, vol. 70, 1951, pp. 690–698.

There are two methods of eliminating the effects of harmonics: The first method is to use a distributed winding, so that the stator magnetomotive force is very close to a sinusoidal wave shape. This method is being commonly used in most single phase motors of the split phase, capacitor start, and the permanent-split capacitor types, but the distributed winding is costly to manufacture. The second method is to skew the rotor cage so that the induced harmonic electromotive forces on different portions of a rotor bar are not of the same phase. This difference in phase angle is larger for the haromonics than for the fundamental by the ratio of the order of the harmonic to one. If the skew angle is sufficiently high, the net harmonic electromotive force on a rotor bar is substantially reduced, and so is the harmonic rotor current. Without appreciable harmonic rotor current to interact with it, the harmonic flux alone cannot cause much loss of mechanical power or cusps in the speed torque curve. The disadvantages of the second method are the following: First, the fundamental component of the induced electromotive force is also reduced by an amount depending on the rotor skew. Second, the harmonic flux gives rise to additional leakage reactance in the stator winding which limits the power input to the motor. By choking the supply, it seriously reduces the maximum torque of the motor.

The following effects are accomplished with the split pole motor arrangement:

1. With the main pole embracing approximately two-thirds of the total pole arc, the third harmonic component in the main winding magnetomotive force is approximately eliminated. The magnitude of the third harmonic is proportional to $$\sin\frac{3\pi q}{2}$$

where $q$ is the fraction of the pole arc under the influence of a concentrated winding. In this arrangement, $q$ for the main winding is approximately ⅔. Then $$\frac{3\pi q}{2}$$

is approximately $\pi$ radians. The sine function of an angle of $\pi$ radians is equal to zero.

2. With the auxiliary winding wound on a portion of the main pole and the entire auxiliary pole, the fraction $q$ for the auxiliary winding is also approximately ⅔. The third harmonic component in the auxiliary winding magnetomotive force is also approximately zero.

3. The effects of the 5th and 7th and higher harmonics are greatly reduced by skewing the rotor as in conventional induction motors, but as the stator m. m. f. is free from third harmonic, the necessary amount of rotor skew is smaller than that of a shaded pole motor although larger than that of a motor with distributed windings. At a skew angle of approximately 40 electrical degrees, the reduction of induced fundamental electromotive force in rotor bars is not yet significant.

4. The slots are so placed and shaped that they allow a large cross-sectional area for the passage of magnetic flux. By increasing the number of lines of flux per pole, the reduction in induced fundamental electromotive force due to the skew and the increase in leakage reactance due to harmonics are partially compensated. It should be noticed that in an ordinary induction motor, the main winding and auxiliary winding are 90 electrical degrees apart. In this motor, the two windings are about 60° (or 120°) apart, so that only one small slot per pole is necessary for the auxiliary winding. The small slot is located in the middle of the main pole so that it does not produce a bottleneck in the magnetic path.

5. The mean length per turn of the main winding is greatly reduced by the shape of the main pole. This reduction in length reduces both the copper loss and the leakage reactance of the motor.

The combined effect of the five items listed above is to make this motor as efficient and powerful as a single phase motor with distributed windings, while the concentrated coil construction greatly reduces its cost.

It will be understood that numerous modifications may be made without departing from the spirit of my invention, and I therefore do not intend to limit myself except as set forth in the claims which follow.

Having now fully described my invention, what I claim as new, and desire to secure by Letters Patent, is:

1. A single phase electric motor having a number of main poles and an equal number of auxiliary poles, winding slots separating said poles, the main poles occupying between about 60% and about 75% of the pole pitch, and the auxiliary poles occupying between about 40% and about 25% of the pole pitch, each of said main poles having a substantially central slot of substantially smaller size than said first mentioned slots, concentrated windings on said poles comprising a main winding wound on said main poles, and an auxiliary winding wound on a portion of each one of said main poles and an entire adjacent one of said auxiliary poles.

2. An electric motor according to claim 1 wherein said main poles are reduced in cross sectional area as the distance from the air gap increases.

3. An electric motor according to claim 1 wherein said main poles are provided with flats.

4. An electric motor according to claim 1 wherein said main poles are reduced in cross sectional area as the distance from the air gap increases and wherein they are provided with flats.

5. An electric motor according to claim 1 said motor having a squirrel cage rotor having bars skewed at an angle of approximately 40 electrical degrees.

6. An electric motor according to claim 1 wherein the main poles occupy substantially two-thirds and the auxiliary poles substantially one-third of the pole pitch.

References Cited in the file of this patent

UNITED STATES PATENTS

| | | |
|---|---|---|
| 732,822 | Bradley | July 7, 1903 |
| 1,185,366 | Burke | May 30, 1916 |
| 1,569,218 | Dake | Jan. 12, 1926 |
| 1,843,315 | Blish et al. | Feb. 2, 1932 |
| 2,124,427 | Morrill et al. | July 19, 1938 |
| 2,267,414 | Morrill | Dec. 23, 1941 |